(12) United States Patent
Skotnicki

(10) Patent No.: US 8,704,386 B2
(45) Date of Patent: Apr. 22, 2014

(54) THERMOELECTRIC GENERATOR

(75) Inventor: Thomas Skotnicki, Crolles-Montfort (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 482 days.

(21) Appl. No.: 12/902,355

(22) Filed: Oct. 12, 2010

(65) Prior Publication Data

US 2011/0115237 A1    May 19, 2011

(30) Foreign Application Priority Data

Oct. 12, 2009  (FR) ...................................... 09 57107

(51) Int. Cl.
*F02B 63/04* (2006.01)
*F01K 15/00* (2006.01)
*B60L 1/02* (2006.01)

(52) U.S. Cl.
USPC .............................................. 290/1 R; 290/2

(58) Field of Classification Search
USPC ....... 290/2, 1 R; 310/306, 309; 136/201, 207; 438/54; 60/527, 528, 529
See application file for complete search history.

(56) References Cited

U.S. PATENT DOCUMENTS

| 2,347,014 | A | * | 4/1944 | Willmann ........................ 60/529 |
| 2,687,005 | A | * | 8/1954 | Ingersoll ........................ 60/529 |
| 3,014,342 | A | * | 12/1961 | Evans ............................ 60/528 |
| 3,149,246 | A | * | 9/1964 | Mason ........................... 310/306 |
| 3,199,302 | A | * | 8/1965 | Rollinger et al. ................ 62/3.7 |
| 3,203,166 | A | * | 8/1965 | Flanagan ........................ 60/528 |
| 3,339,077 | A | * | 8/1967 | Shapiro .......................... 290/1 R |
| 3,725,835 | A | * | 4/1973 | Hopkins et al. ............... 337/140 |
| 4,742,678 | A | | 5/1988 | Bartholomew et al. |
| 5,977,858 | A | * | 11/1999 | Morgen et al. ................ 337/140 |
| 6,161,382 | A | * | 12/2000 | Brotz .............................. 60/528 |
| 6,374,607 | B1 | | 4/2002 | Takabu |
| 6,750,596 | B2 | * | 6/2004 | Kim et al. ...................... 310/339 |
| 6,911,891 | B2 | * | 6/2005 | Qiu et al. ........................ 337/53 |
| 7,034,440 | B2 | * | 4/2006 | Kim et al. ...................... 310/339 |
| 7,397,169 | B2 | * | 7/2008 | Nersessian et al. ........... 310/339 |
| 2003/0121260 | A1 | | 7/2003 | Sinclair |
| 2007/0095381 | A1 | * | 5/2007 | Lee ................................ 136/230 |
| 2009/0205694 | A1 | * | 8/2009 | Huettner et al. ............... 136/201 |
| 2009/0315335 | A1 | * | 12/2009 | Ujihara et al. ................ 290/1 R |
| 2010/0133952 | A1 | * | 6/2010 | Bang et al. .................... 310/309 |
| 2011/0173970 | A1 | * | 7/2011 | Torres-Jara et al. ............ 60/528 |
| 2012/0298165 | A1 | * | 11/2012 | Kurihara et al. .............. 136/230 |

FOREIGN PATENT DOCUMENTS

WO       WO 02/48507 A1    6/2002

OTHER PUBLICATIONS

French Search Report dated Jun. 23, 2010 from corresponding French Application No. 09/57107.

\* cited by examiner

*Primary Examiner* — Julio Gonzalez
(74) *Attorney, Agent, or Firm* — Wolf, Greenfield & Sacks, P.C.

(57) ABSTRACT

A thermoelectric generator including a membrane maintained by lateral ends and capable of taking a first shape when its temperature reaches a first threshold and a second shape when its temperature reaches a second threshold greater than the first threshold; at least one electrically conductive element attached to with the membrane and connecting the lateral ends of the membrane; and circuitry capable of generating, at the level of the membrane, a magnetic field orthogonal to the membrane displacement direction, the lateral ends of the membrane being connected to output terminals of the generator.

19 Claims, 2 Drawing Sheets

THERMOELECTRIC GENERATOR

CROSS REFERENCE TO RELATED APPLICATIONS

This application claims the priority benefit of French patent application number 09/57107, filed on Oct. 12, 2010, entitled "THERMOELECTRIC GENERATOR," which is hereby incorporated by reference to the maximum extent allowable by law.

BACKGROUND OF THE INVENTION

1. Field of the Invention

The present invention relates to a thermoelectric generator, that is, a device capable of generating electricity from a heat source. It especially aims at the exploitation of the thermal power generated by certain equipment, for example, electronic boxes, a car muffler, the roof of a house, or any other hot surface.

2. Discussion of the Related Art

In certain mobile devices, for example, telephones, watches, or pacemakers, it has been provided to use microgenerators to generate electricity from the mechanical vibrations resulting from the user's motions. This enables to at least partially recharge the device batteries. A disadvantage of such a solution is that it cannot be used in the case of fixed equipment, for example, a television set or a computer.

Devices capable of directly converting heat into electricity via the Seebeck effect have also been provided. It has indeed been observed that a potential difference appears at the junction of two conductive materials submitted to a temperature difference. However, such devices have a very low efficiency. In practice, the use of the Seebeck effect is mainly limited to temperature measurement applications.

Thermoelectric generators with micro-turbines have further been provided, for example comprising turbines having a diameter on the order of 4 mm and capable of being integrated in electronic components. However, such devices are expensive since they comprise rotating mechanical portions which are difficult to form.

SUMMARY OF THE INVENTION

Thus, an object of an embodiment of the present invention is to provide a thermoelectric generator overcoming at least some of the disadvantages of prior art solutions.

An object of an embodiment of the present invention is to provide such a generator which is easy to manufacture.

An object of an embodiment of the present invention is to provide such a generator which is easy to integrate in conventional equipment.

Thus, an embodiment of the present invention provides a thermoelectric generator comprising a membrane maintained by lateral ends and capable of taking a first shape when its temperature reaches a first threshold and a second shape when its temperature reaches a second threshold greater than the first threshold; at least one electrically conductive element attached to the membrane and connecting the lateral ends of the membrane; and means capable of generating, at the level of the membrane, a magnetic field orthogonal to the membrane displacement direction, the lateral ends of the membrane being connected to output terminals of the generator.

According to an embodiment of the present invention, the membrane is metallic.

According to an embodiment of the present invention, the membrane, in its first shape, is capable of being in contact with a hot wall and, in its second shape, is capable of being in contact with a cold wall.

According to an embodiment of the present invention, the membrane comprises a main metal strip and, at its lateral ends, layer portions, superposed to the main metal strip, made of a material having a thermal expansion coefficient lower than that of the main metal strip, the lateral ends bearing against a fixed support.

According to an embodiment of the present invention, the generator is capable of being assembled on an integrated circuit chip.

The foregoing objects, features, and advantages of the present invention will be discussed in detail in the following non-limiting description of specific embodiments in connection with the accompanying drawings.

DETAILED DESCRIPTION

Figure 1A:
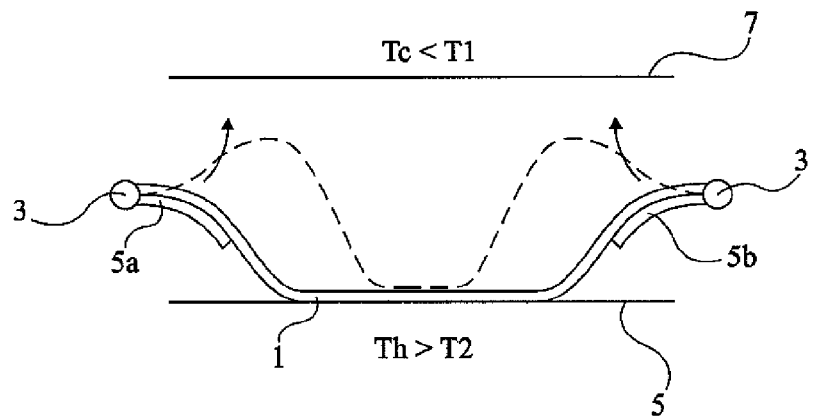
FIGS. 1A and 1B are simplified cross-section views of an embodiment of a thermoelectric generator.

For clarity, the same elements have been designated with the same reference numerals in the different drawings and, further, the various drawings are not to scale.

An aspect of an embodiment of the present invention is to provide a device capable of:

converting thermal power into mechanical power by means of a membrane moveable between two positions, provided to change shape when its temperature varies; and converting the mechanical power generated by the membrane into electric power.

Figure 1B:
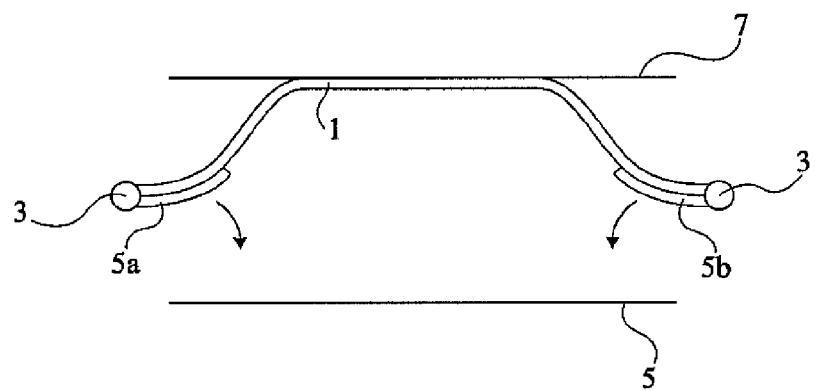

FIGS. 1A and 1B are simplified cross-section views of an embodiment of a thermoelectric generator. This generator comprises a metal membrane 1 attached by its lateral ends to a support 3. In this example, membrane 1 has, in top view, an elongated rectangular shape and dimensions on the order of a few centimeters and a width of a few millimeters. However, the membrane may have any other shape or size. As an example, the membrane may have micrometric dimensions and be manufactured according to MEMS-type ("MicroElectroMechanical Systems) manufacturing technologies.

In this example, support 3 comprises two fixed parallel cylindrical axes. The membrane is arranged between the two axes, its lateral ends bearing against the axes. The lateral ends of the membrane have a cross-section substantially of same cylindrical shape as the axes of support 3, so that the membrane can move, when it is submitted to a pressure, from a high position to a low position, by sliding of its lateral ends around the axes of support 3.

Membrane 1 is provided to alternate between two shapes when its temperature varies. In its first shape, membrane 1 is curved downwards, as shown in FIG. 1A. This first shape corresponds to an idle state, taken by the membrane when its temperature is lower than a first threshold T1. In its second shape, the membrane is curved upwards, as shown in FIG. 1B. The second shape is taken by the membrane when its temperature is greater than a second threshold T2 greater than or equal to T1. A membrane operating according to a hysteresis cycle is here considered, that is, second threshold T2 is greater than first threshold T1.

According to an embodiment, the lateral ends of membrane 1 comprise bimetallic strips. As an example, if membrane 1 is made of a metal with a low thermal expansion coefficient, it is provided to deposit, superposed to its lateral ends, layers 5a, 5b of a material having a high thermal expansion coefficient. Due to the difference in thermal expansion coefficients, the bimetallic strips bend progressively in one direction or in the other when the membrane temperature varies. The deformation of the bimetallic strips under the effect of the temperature variations causes a spring effect, enabling to impose two shapes to the membrane (high position and low position), according to the membrane temperature, and a fast transition from one shape to the other. FIG. 1A schematically illustrates, in dotted lines, a transition shape of the membrane during its fast transition from the low position to the high position, after the membrane temperature has reached threshold T2.

It is provided to arrange membrane 1 between two opposite walls 5 and 7. Lower wall 5 is a hot wall, for example a metal wall of a car silencer, the roof of a house, an integrated circuit chip package, or another electronic circuit. Upper wall 7 is a cold wall, that is, its temperature is substantially lower than that of the hot wall. It may be a radiator, an external package of an electronic device, or simply ambient air. The arrangement is selected so that the membrane comes, in its first shape, in contact with hot wall 5, and in its second shape, in contact with cold wall 7.

Figure 2:
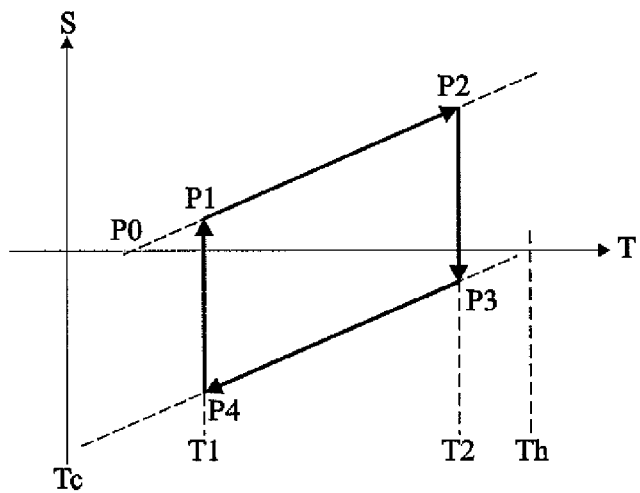
FIG. 2 is a diagram partly illustrating the operating principle of the thermoelectric generator described in relation with FIGS. 1A and 1B.

FIG. 2 is a diagram schematically illustrating the principle of the conversion of the thermal power of the hot generator wall into mechanical power. This diagram illustrates the variation of mechanical stress S exerted in the membrane according to temperature T of the membrane. In an initial phase P0, the heat source does not operate and the membrane temperature is lower than T1. The membrane then is in its first shape, in contact with the hot wall (which is cold in the present case) of the generator. When the system starts heating up, the membrane temperature, in contact with the hot wall, progressively increases.

A steady operating state is considered hereafter, that is, the hot and cold walls of the thermoelectric generator are at substantially constant temperatures, respectively Th and Tc, with Tc<T1<T2<Th. The generator then periodically follows a cycle P1-P2-P3-P4.

At point P1, the membrane temperature is equal to first threshold T1, and the membrane is in its first shape, in contact with the hot wall. The membrane temperature progressively increases, between points P1 and P2. This results in a curving of its bimetallic lateral ends.

At point P2, the membrane temperature reaches second shape change threshold T2. The membrane then abruptly takes its second shape, and comes into contact with the cold wall of the generator.

Then, from point P3, the temperature of the membrane, in contact with the cold wall, progressively decreases, causing a bending of its lateral bimetallic ends.

At point P4, the membrane temperature reaches the first threshold, T1, at which its shape changes. The membrane then abruptly recovers its first shape and comes into contact with the hot wall of the generator. The cycle then resumes from phase P1.

Thus, the thermal power of the hot wall is transferred by the membrane to the cold wall by increments. This transfer causes displacements of the membrane at a frequency especially depending on the dimensions, on the temperatures of the hot and cold walls, and on the materials used.

Figure 3:
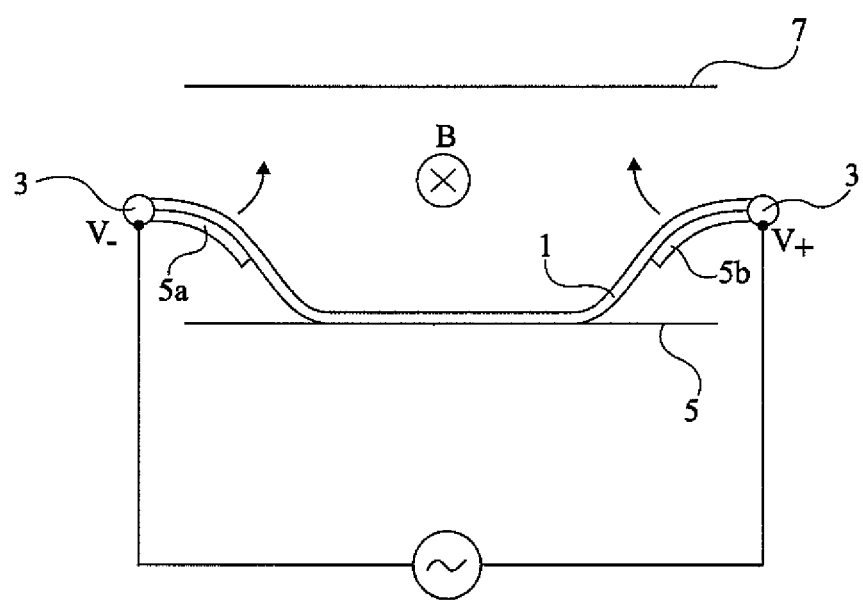
FIG. 3 is a more detailed cross-section view illustrating the operation of the thermoelectric generator of FIGS. 1A and 1B.

FIG. 3 is a simplified cross-section view illustrating an embodiment of a system for converting the mechanical power of the membrane into electric power.

Membrane 1 of the generator is placed in a magnetic field B, for example, generated by magnets (not shown). In this example, field B is parallel to the axes of support 3 of the membrane. Due to the displacements of the conductive metal membrane in field B, along a direction orthogonal to field B, a potential difference $V_+-V_-$ appears between the lateral ends of the membrane. It may be provided to form output terminals of the generator connected to the lateral ends of the membrane, for example, via support 3.

To optimize the efficiency of the generator, it is desirable for the temperature difference Th–Tc between the hot and cold walls to be maximum.

To improve the thermal contact between the membrane and the hot and cold walls, a thermally conductive oil film may, if necessary, be provided on each of the walls. It is further preferable for the membrane to have a low heat capacity to promote heat transfers between the hot wall and the cold wall.

Specific embodiments of the present invention have been described. Different variations and modifications will occur to those skilled in the art.

In particular, a thermoelectric generator in which the fast motions of a metal membrane mobile in a magnetic field generate, between the lateral ends of the membrane, a potential difference has been described. A non-conductive mobile membrane on which are arranged one or several conductors orthogonal to the magnetic field may also be provided.

More generally, it will be within the abilities of those skilled in the art to provide other means capable of converting the mechanical power of the mobile membrane into electric power.

Moreover, the use of a membrane between two fixed support axes has been provided hereabove, the lateral ends of the membrane being formed of bimetallic strips. Other means, for example, springs, capable of imposing two shapes to the membrane according to its temperature, and a fast transition between the two shapes, may be provided. More generally, any known means may be used to form a membrane mobile between two shapes according to temperature.

Further, the present invention is not limited to the use of the above-mentioned heat sources to operate the thermoelectric generator. According to an alternative embodiment, not shown, the hot wall directly is the rear surface of the substrate of an integrated circuit chip. In this variation, in its first shape, the membrane takes the shape of the rear surface of the substrate.

More generally, it will be within the abilities of those skilled in the art to provide any means capable of making the generator easy to use, for example, a package made of two thermally-conductive portions separated from each other by an insulating material, the membrane coming, in its first shape, in contact with the first portion of the package and, in its second shape, in contact with the second portion of the package.

Further, the present invention is not limited to the above-described means of connection of the mobile membrane to the output terminals of the generator. It will be within the abilities of those skilled in the art to implement any other adapted connection means.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A thermoelectric generator comprising:
    a membrane maintained by lateral ends and configured to take a first shape when a temperature of the membrane reaches a first threshold and a second shape when the temperature of the membrane reaches a second threshold greater than the first threshold;
    at least one electrically conductive element attached to the membrane and connecting the lateral ends of the membrane; and
    a magnetic element configured to generate, in a region of the membrane, a magnetic field orthogonal to a membrane displacement direction, lateral ends of the conductive element being connected to output terminals of the generator, wherein the membrane is located in the magnetic field during displacement of the membrane between the first and second shapes and wherein a potential difference appears between the lateral ends of the conductive element in response to displacement of the membrane in the magnetic field between the first and second shapes; and
    wherein the membrane comprises a main metal strip and, at the lateral ends of the membrane, layer portions, superposed to the main metal strip, made of a material having a thermal expansion coefficient lower than that of the main metal strip, the lateral ends bearing against a fixed support.

2. The generator of claim 1, wherein the membrane is metallic, said at least one electrically conductive element and the membrane forming a same part.

3. The generator of claim 1, wherein the membrane, in the first shape, is configured to contact a hot wall and, in the second shape, configured to contact a cold wall.

4. The generator of claim 1, wherein the generator is configured to be assembled on an integrated circuit chip.

5. A thermoelectric generator comprising:
    a membrane configured for displacement between a first position and a second position, wherein the membrane is configured for displacement from the second position to the first position when a temperature of the membrane decreases to a first threshold and wherein the membrane is configured for displacement from the first position to the second position when the temperature of the membrane increases to a second threshold greater than the first threshold, the membrane including at least one electrically conductive element connecting ends of the membrane; and
    a magnetic element configured to provide a magnetic field in a region of the membrane and orthogonal to a direction of displacement of the membrane, wherein the membrane is located in the magnetic field during displacement of the membrane between the first and second positions, wherein the at least one electrically conductive element provides an output of the thermoelectric generator and wherein a potential difference appears between ends of the conductive element in response to displacement of the membrane in the magnetic field between the first and second positions; and
    wherein the membrane comprises a main metal strip and, at the lateral ends of the membrane, layer portions, superposed to the main metal strip, made of a material having a thermal expansion coefficient lower than that of the main metal strip, the lateral ends bearing against a fixed support.

6. A thermoelectric generator as defined in claim 5, wherein the membrane is electrically conductive.

7. A thermoelectric generator as defined in claim 5, wherein the membrane comprises a metallic strip.

8. A thermoelectric generator as defined in claim 5, wherein at least a part of the membrane comprises a bimetallic strip configured for displacement in response to a change in temperature.

9. A thermoelectric generator as defined in claim 5, wherein the membrane comprises a strip including ends connected for displacement about parallel axes between the first and second positions.

10. A thermoelectric generator as defined in claim 5, wherein the membrane is configured to contact a hot element in the first position and is configured to contact a cold element in the second position.

11. A thermoelectric generator as defined in claim 10, wherein a temperature of the cold element is lower than the first threshold and wherein the temperature of the hot element is greater than the second threshold.

12. A thermoelectric generator as defined in claim 5, wherein the membrane is configured for alternating displacement between the first and second positions.

13. A thermoelectric generator as defined in claim 5, wherein the first position corresponds to a first shape of the membrane and wherein the second position corresponds to a second shape of the membrane.

14. A method for thermoelectric generation comprising:
    configuring a membrane for displacement between a first position and a second position, wherein the membrane is configured for displacement from the second position to the first position when a temperature of the membrane decreases to a first threshold, and wherein the membrane is configured for displacement from the first position to the second position when the temperature of the membrane increases to a second threshold greater than the first threshold, the membrane including at least one electrically conductive element connecting ends of the membrane;
    providing a magnetic field in a region of the membrane and orthogonal to a direction of displacement of the membrane; and
    obtaining an output from the electrically conductive element of the membrane, wherein the membrane is located in the magnetic field during displacement of the membrane between the first and second positions, wherein a potential difference appears between ends of the conductive element in response to displacement of the membrane in the magnetic field between the first and second positions; and
    wherein the membrane comprises a main metal strip and, at the lateral ends of the membrane, layer portions, superposed to the main metal strip, made of a material having a thermal expansion coefficient lower than that of the main metal strip, the lateral ends bearing against a fixed support.

15. A method as defined in claim 14, wherein configuring the membrane comprises configuring a bimetallic strip for displacement in response to a change in temperature.

16. A method as defined in claim 14, wherein the membrane comprises a strip including ends connected for displacement about parallel axes between the first and second positions.

17. A method as defined in claim 14, wherein the membrane is configured to contact a hot element in the first position and is configured to contact a cold element in the second position.

18. A method as defined in claim 14, wherein the membrane is configured for alternating displacement between the first and second positions.

19. A method as defined in claim 14, wherein the first position corresponds to a first shape of the membrane and wherein the second position corresponds to a second shape of the membrane.

* * * * *